(12) United States Patent
Papon et al.

(10) Patent No.: US 10,607,105 B1
(45) Date of Patent: Mar. 31, 2020

(54) PERCEPTUAL DATA ASSOCIATION

(71) Applicant: Disney Enterprises, Inc., Burbank, CA (US)

(72) Inventors: Jeremie A. Papon, Los Angeles, CA (US); Kyle G. Freeman, Agoura, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/366,191

(22) Filed: Mar. 27, 2019

(51) Int. Cl.
| | |
|---|---|
| G06T 13/80 | (2011.01) |
| G06K 9/46 | (2006.01) |
| G06T 11/00 | (2006.01) |
| G06T 7/70 | (2017.01) |
| G06K 9/62 | (2006.01) |

(52) U.S. Cl.
CPC .......... *G06K 9/469* (2013.01); *G06K 9/6201* (2013.01); *G06K 9/6288* (2013.01); *G06T 7/70* (2017.01); *G06T 11/00* (2013.01); *G06T 2207/20072* (2013.01); *G06T 2210/61* (2013.01)

(58) Field of Classification Search
None
See application file for complete search history.

(56) References Cited

U.S. PATENT DOCUMENTS

| | | | | |
|---|---|---|---|---|
| 5,751,377 A * | 5/1998 | Kadono | ............... | H04N 19/119 348/586 |
| 6,204,850 B1 * | 3/2001 | Green | ................. | G06F 16/9024 715/850 |
| 6,741,242 B1 * | 5/2004 | Itoh | .......... | G06T 15/00 345/419 |
| 7,003,136 B1 * | 2/2006 | Harville | ............. | G06K 9/00201 348/169 |
| 8,274,506 B1 * | 9/2012 | Rees | ....................... | G06T 17/05 345/419 |
| 10,012,729 B2 | 7/2018 | Freeman | | |
| 10,198,811 B2 * | 2/2019 | Kamiyama | ........... | G06T 7/0016 |
| 2002/0032697 A1 * | 3/2002 | French | ................. | G06T 17/005 715/211 |
| 2005/0283337 A1 * | 12/2005 | Sayal | ..................... | G06Q 10/00 702/179 |
| 2007/0242899 A1 * | 10/2007 | Satoh | ....................... | G06T 7/73 382/286 |
| 2008/0187172 A1 * | 8/2008 | Otsu | ....................... | G06K 9/32 382/103 |
| 2011/0173231 A1 * | 7/2011 | Drissi | ............... | G06F 16/24568 707/771 |

(Continued)

*Primary Examiner* — Martin Mushambo
(74) *Attorney, Agent, or Firm* — Patterson + Sheridan, LLP (57) ABSTRACT

Embodiments provide for perceptual data association received from at least a first and a second sensor disposed at different positions in an environment, in respective time series of local scene graphs that identify several characteristics of at least one object in the environment that are updated different rates; merging, at an output rate, characteristics for each given object from the several time series of local scene graphs that are updated at the output rate; merging, at the output rate, characteristics for each given object from the time series of local scene graphs that are updated at rates other than the output rate; and outputting, at the output rate, a time series of global scene graphs including the merged characteristics.

20 Claims, 8 Drawing Sheets

(56) References Cited

U.S. PATENT DOCUMENTS

| | | | |
|---|---|---|---|
| 2016/0253800 A1* | 9/2016 | Gurevich | A61B 5/0071 |
| | | | 382/128 |
| 2017/0186129 A1* | 6/2017 | Brabec | G06F 19/324 |
| 2017/0206290 A1* | 7/2017 | Kudo | G06F 17/11 |
| 2017/0317874 A1* | 11/2017 | Borah | H04L 41/0668 |
| 2018/0182496 A1* | 6/2018 | Yakami | G16H 50/70 |
| 2018/0190000 A1* | 7/2018 | Berglund | G06T 13/80 |
| 2018/0309637 A1* | 10/2018 | Gill | H04L 67/36 |

* cited by examiner

| 210 | 220 | | 230 | | 240 | | 250 | | 260 | |
|---|---|---|---|---|---|---|---|---|---|---|
| Person 1 | D5, θ20 | t2 | [Limb Positions] | t1 | None | t1 | Happy | t1 | Person 2 | t1 |
| Person 2 | D1, θ90 | t2 | [Limb Positions] | t1 | Object 1 | t1 | Null | t1 | Person 1 | t1 |
| Object 1 | D5, θ20 | t2 |  |  | Person 2 | t1 |  |  |  |  |

FIG. 2B (200b)

| 210 | 220 | | 230 | | 240 | | 250 | |
|---|---|---|---|---|---|---|---|---|
| Person 1 | D1, θ100 | t2 | [Limb Positions] | t1 | None | t1 | Happy | t1 |
| Person 2 | D6, θ170 | t2 | [Limb Positions] | t1 | Object 1 | t1 | Null | t1 |
| Object 1 | D1.5, θ100 | t2 |  |  | Person 2 | t1 |  |  |

FIG. 2C (200c)

| 210 | 220 | | 230 | | 240 | | 250 | | 260 | |
|---|---|---|---|---|---|---|---|---|---|---|
| Person 1 | X15, Y5 | t2 | [Limb Positions] | t1 | None | t1 | Happy | t1 | Person 2 | t1 |
| Person 2 | X5, Y20 | t2 | [Limb Positions] | t1 | Object 1 | t1 | Null | t1 | Person 1 | t1 |
| Object 1 | X15, Y5 | t2 |  |  | Person 2 | t1 |  |  |  |  |

PERCEPTUAL DATA ASSOCIATION

BACKGROUND

Amalgamated image processing systems may combine the data from several camera sensors (among other sensors) into a coherent representation of an environment. Each of the camera sensors may produce data at different rates, from different perspectives, using different algorithms or models, etc., that a central processor interprets to build the coherent representation of the environment to make sense of the disparate data received.

SUMMARY

The present disclosure provides, in one embodiment, a method for perceptual data association, comprising: receiving, from a first sensor disposed at a first position in an environment, a first time series of local scene graphs comprising a first characteristic of an object in the environment that is updated at a first rate and a second characteristic of the object that is updated at a second rate different from the first rate; receiving, from a second sensor disposed at a second position in the environment, a second time series of local scene graphs each comprising the first characteristic of the object that is updated at the first rate and the second characteristic of the object that is updated at a third rate different from the first rate and the second rate; merging the first time series of local scene graphs with the second time series of local scene graphs according to the first rate to determine a global first characteristic for the object at the first rate; merging the first time series of local scene graphs with the second time series of local scene graphs according to the second rate and the third rate to determine a global second characteristic for the object at the first rate; and outputting a time series of global scene graphs including the global first characteristic and the global second characteristic at the first rate.

The present disclosure provides, in one embodiment, a system, comprising: a processor; and a memory storage device, including instructions that when executed by the processor enable the processor to: receive, from a first sensor disposed at a first position in an environment, a first time series of local scene graphs comprising a first characteristic of an object in the environment that is updated at a first rate and a second characteristic of the object that is updated at a second rate different from the first rate; receive, from a second sensor disposed at a second position in the environment, a second time series of local scene graphs each comprising the first characteristic of the object that is updated at the first rate and the second characteristic of the object that is updated at a third rate different from the first rate and the second rate; merge the first time series of local scene graphs with the second time series of local scene graphs according to the first rate to determine a global first characteristic for the object at the first rate; merge the first time series of local scene graphs with the second time series of local scene graphs according to the second rate and the third rate to determine a global second characteristic for the object at the first rate; and output a time series of global scene graphs including the global first characteristic and the global second characteristic at the first rate.

The present disclosure provides, in one embodiment, a non-transitory computer-readable medium containing computer program code that, when executed by operation of one or more computer processors, performs an operation for perceptual data association comprising: receiving, from a first sensor disposed at a first position in an environment, a first time series of local scene graphs comprising a first characteristic of an object in the environment that is updated at a first rate and a second characteristic of the object that is updated at a second rate different from the first rate; receiving, from a second sensor disposed at a second position in the environment, a second time series of local scene graphs each comprising the first characteristic of the object that is updated at the first rate and the second characteristic of the object that is updated at a third rate different from the first rate and the second rate; merging the first time series of local scene graphs with the second time series of local scene graphs according to the first rate to determine a global first characteristic for the object at the first rate; merging the first time series of local scene graphs with the second time series of local scene graphs according to the second rate and the third rate to determine a global second characteristic for the object at the first rate; and outputting a time series of global scene graphs including the global first characteristic and the global second characteristic at the first rate.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The present disclosure provides for perceptual data association to address and standardize the processing of data that are received from various sources at various rates. In a distributed system monitoring a scene in a real-world environment, several sensors in the environment may analyze the scene using various algorithms/models that return results at different times. Several algorithms/models running on one sensor may use the same visual data inputs to produce different outputs, and those algorithms/models may run at the same time using visual data inputs taken at the same time from a different perspective on a second sensor. For example, a first algorithm/model and a second algorithm/model on a first sensor may use an image of the environment taken at time $t_0$ and return results at times $t_1$ and $t_2$ respectively. A second sensor may also run the first algorithm/ model and the second algorithm/model, but use an image of the environment captured from a different perspective and/or at a different time. When a central collector receives the data from the various sensors, the central collector translates and reconciles the timing and spacing of the determinations made by the various sensors to form a coherent image of the environment. By collecting the data as a time series from each of the sensors, a collector is able to adjust and use the most recently received data to hide any discrepancies in reporting rates to provide an output at a single steady rate to any downstream processes.

The present disclosure provides improvements to visual processing by reducing the computational resources needed to translate and reconcile data received from disparate sensors, providing the ability to hide any delays in algorithms/models that take longer to process from downstream applications that use the output of those algorithms/models as inputs, and extending the modularity of the plurality of sensors and algorithms/models used by a central collector, among other benefits.

Figure 1A:
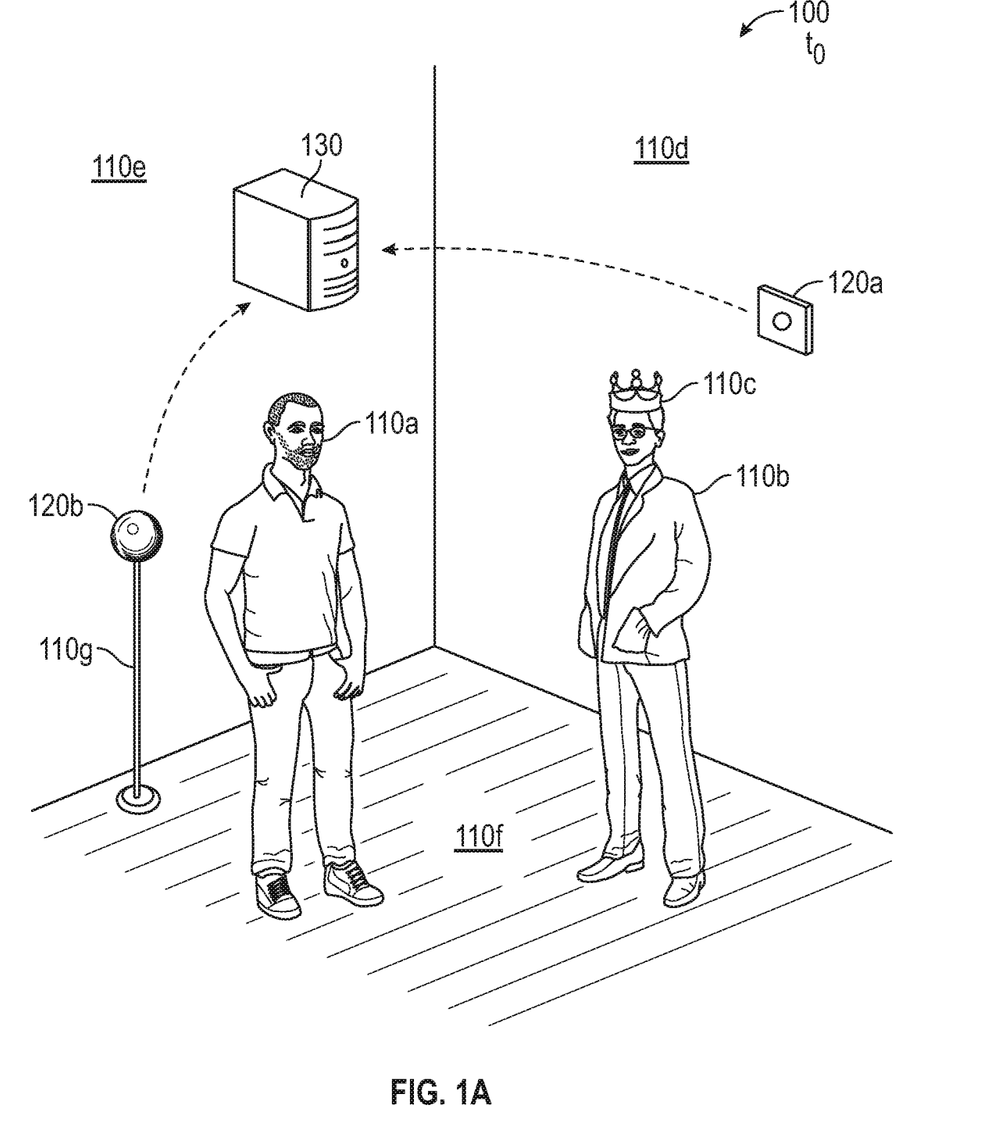
FIG. 1A-1C illustrate a physical environment at various times including various objects, according to aspects of the present disclosure.
Figure 1B:
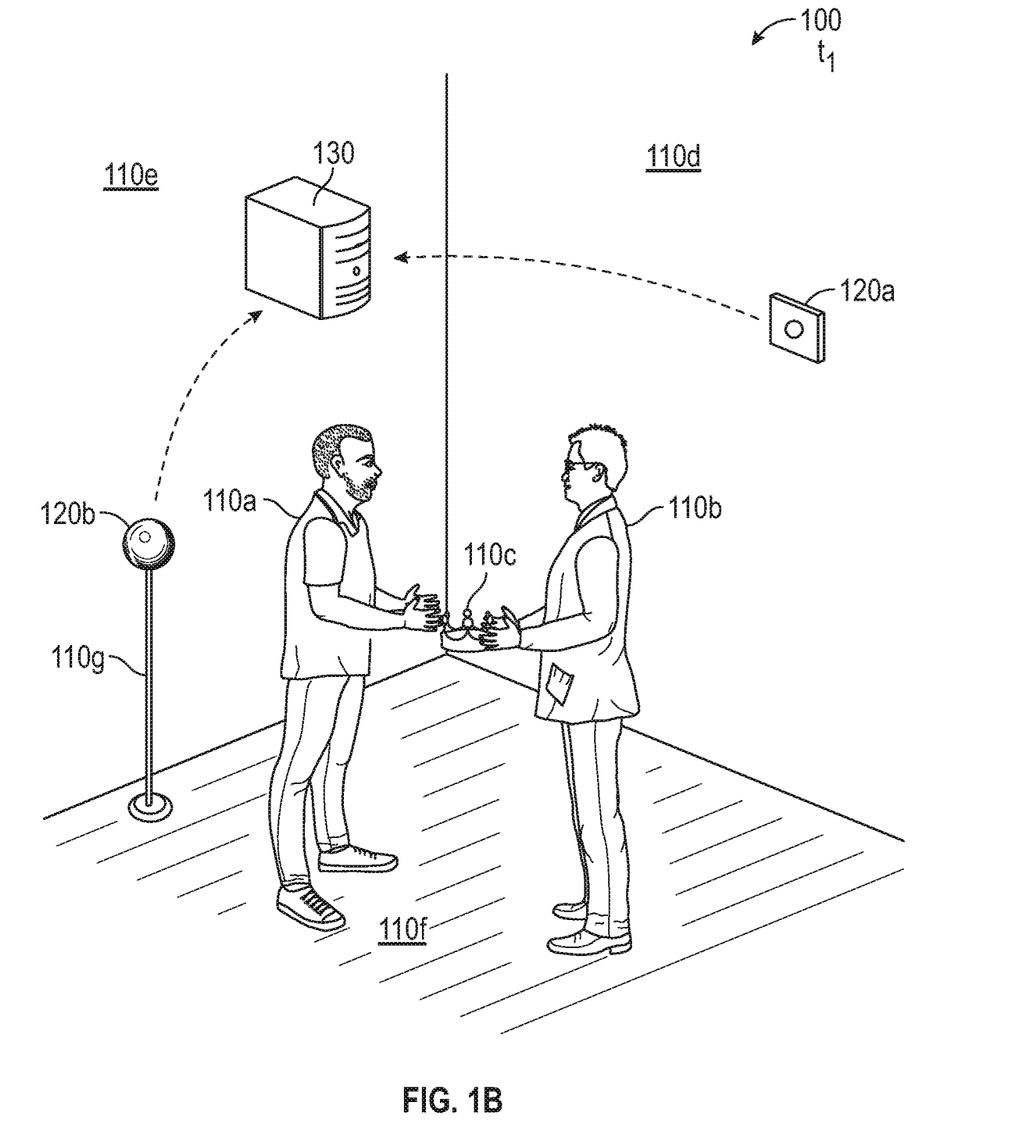
Figure 1C:
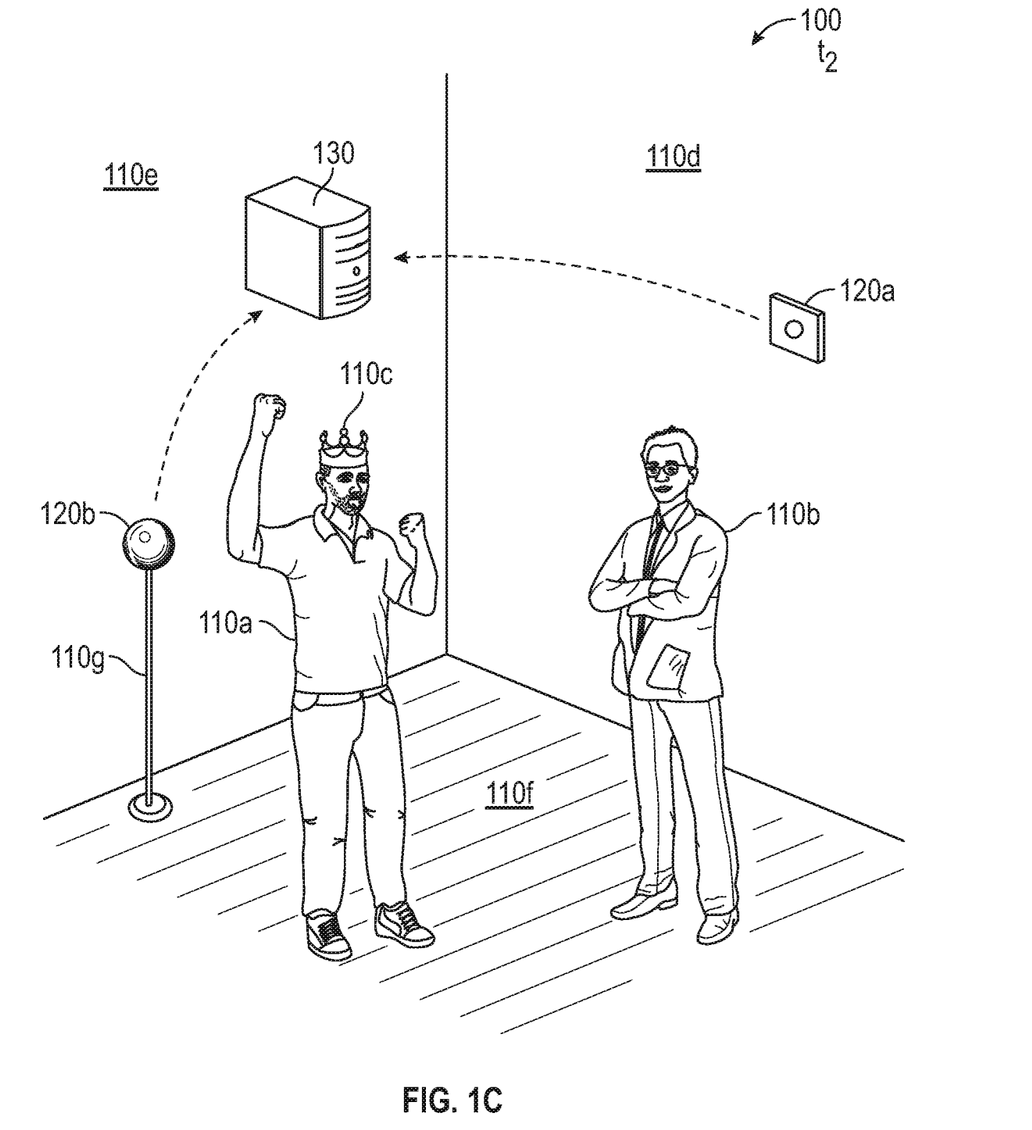

FIGS. 1A-1C illustrate a physical environment 100 at various times including various objects (including inanimate and animate objects, such as persons). FIG. 1A illustrates the physical environment 100 at an initial time $t_0$, FIG. 1B illustrates the physical environment 100 at a time $t_1$, and FIG. 1C illustrates the physical environment 100 at a time $t_2$. Various times are referenced herein, using a designation of $t_x$, in which a lower value for the subscript x indicates that a time occurred earlier relative to higher values for the subscript x in a sequence of times. The amount of time passing between two adjacently indicated times $t_x$ may vary or be constant in different embodiments, and the amount of time between adjacently indicated times $t_x$ in the sequence may be constant or variable over the course of the sequence.

In FIGS. 1A-1C, several objects 110 compose a scene in the environment 100 that is monitored by several sensors 120 that provide analysis of the scene to a collector 130. For purposes of explanation, the present disclosure discusses a first sensor 120a and a second sensor 120b, but three or more sensors 120 may be used in other embodiments without departing from the spirit of the present disclosure. Similarly, although six objects 110a-f of various types are illustrated in FIGS. 1A-1C, the sensors 120 in other embodiments may observe and analyze an environment 100 including a different number of objects 110 and of different types than those discussed in the examples provided herein.

In FIG. 1A, a first object is illustrated as a first person 110a standing next to a second object which is a second person 110b who is wearing a third object which is a crown 110c. In various embodiments, the sensors 120 include image processing software that identifies specific types of objects 110 in the environment, such as, for example, persons, identity badges, vehicles, goods, packages, etc., or objects 110 whose locations change over time. Other objects 110 in the scene include a first wall (fourth object 110d), a second wall (fifth object 110e), additional walls (not illustrated), the floor (sixth object 100f), and the ceiling (not illustrated), which may be observed by one or more of the sensors 120, but may be ignored or not reported out by the image processing software. For example, the sensors 120 may identify various objects 110 as components of the environment 100 or otherwise static, and report the position of these objects 110 in an initial setup phase, to provide the collector 130 with information about the environment 100, and then omit the position and other observations of these objects 110 in future reports. In some embodiments, the sensors 120 may be identified as objects 110 or components of other objects 110 by other sensors 120. For example, a first sensor 120a may identify the second sensor 120b as a seventh object 110g or component of a seventh object 110g (e.g., a camera stand that includes or supports a sensor 120).

The sensors 120 identify various attributes related to the objects 110, such as, for example, a position or coordinates of an object 110 in the environment 100, an identity of the object, whether two or more objects 110 are associated with one another, a feature layout of the object 110 (e.g., limb/joint positions of a person), a focus of the object 110 (e.g., gaze direction of a person, direction of travel of a vehicle), a state of the object 110 (e.g., emotional affect of a person, power status of a device), etc. These data, including the images of the objects 110 and the determined attributes and characteristics of those objects 110, are collectively referred to herein as perceptual data.

Each sensor 120 independently analyzes the environment 100 based on the perspective and other data available to that individual sensor 120, and forwards the analysis of the scene to the collector 130 for detailed analysis from several perspectives. For example, the first sensor 120a and the second sensor 120b each make the determination of whether the crown 110c is associated with the second person 110b independently and, using the determinations from the individual sensors 120, the collector 130 determines whether to treat the crown 110c as associated with the second person 110b, the first person 110a, or no one. In some aspects, one sensor 120 (e.g., as master sensor 120) acts as the collector 130 and analyzes the environment 100.

Because the sensors 120 do not have perfect information from the environment 100, and some of the analyses of the environment 100 may take longer to calculate and propagate than other analyses, the collector 130 receives the various analyses from the various sensors 120 asynchronously, and determines how to represent or render a virtual-environment based on the real-world environment 100 using the most reliable and up-to-date data from the various sensors 120. For example, as the second person 110b transfers the crown 110c to the first person 110a in FIG. 1B at time $t_1$, and as the first person accepts the crown in FIG. 1C at time $t_2$, the individual sensors 120 may provide conflicting information about the persons and the crown 110c at different times. To resolve this conflict, the collector 130 chooses one of the information sets to use or amalgamates the data sets to determine a single state of the environment 100 and the objects 110 therein.

Figure 2A:
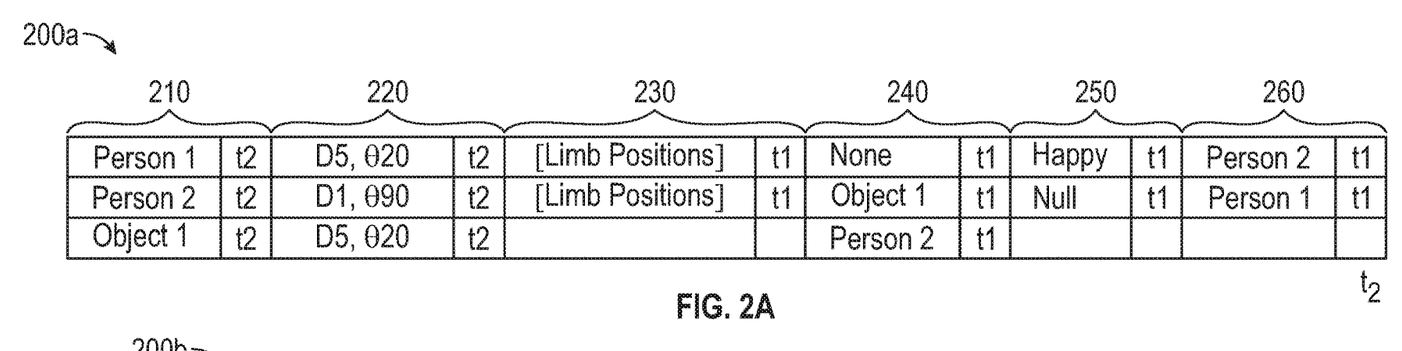
FIGS. 2A-2C illustrate scene graphs, according to aspects of the present disclosure.
Figure 2B:
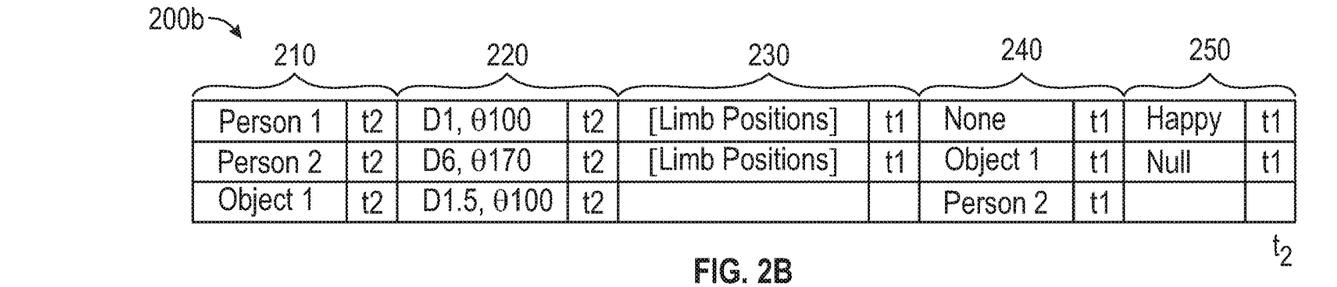
Figure 2C:
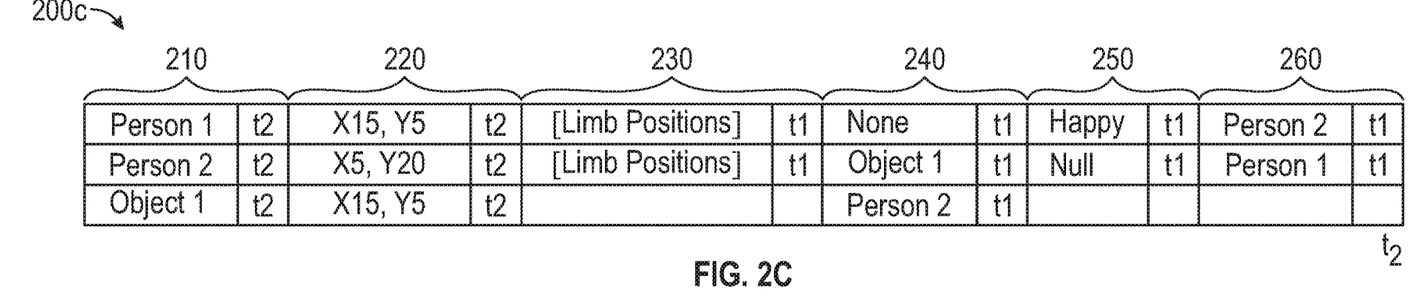

To aid the collector 130 in amalgamating the data, the sensors 120 organize the determined attributes of the environment 100 and objects 110 into scene graphs 200, such as those illustrated in FIGS. 2A-2C. A scene graph 200 from the perspective of an individual sensor 120 may be referred to as a local scene graph 200, whereas a scene graph from the perspective of several sensors 120 (as is created by a collector 130) may be referred to as a global scene graph 200. Although not illustrated, the scene graphs 200 may include or be associated with a timestamp or be organized into a time series of several scene graphs 200. Additionally, although a given number of attributes are discussed as being included in the example scene graphs 200 discussed herein, a scene graph 200 may include more or fewer attribute values in various embodiments.

FIG. 2A illustrates a first scene graph 200a at time $t_2$ from the perspective of the first sensor 120a shown in FIGS. 1A-1C, according to various embodiments of the present disclosure. The first scene graph 200a includes data identifying the objects 110 recognized by the first sensor 120a and the attributes of those objects 110. The attributes of an object 110 are determined using various algorithms/models that return a result after various amounts of processing. For example, the first scene graph 200a includes an identity attribute 210 for the first object 110a, for the second object 110b, and the third object 110c, which are determined by a first algorithm/model. The first scene graph 200a also includes a position attribute 220 for the objects 110, identifying where the first sensor 120 has determined the objects 110 to be located in the environment 100. In the present example, the output of the first algorithm/model (i.e., the identity attribute 210) and the second algorithm/model (i.e., the position attribute 220) are based on an image of the environment 100 captured by the first sensor 120a at time $t_2$.

In various aspects, some algorithms/models take longer to produce results or are run less frequently than other algorithms/models, and the scene graph 200 includes an attribute value related to a state of the environment that occurred at an earlier time. For example, the first scene graph 200a includes a pose attribute 230, which identifies how an object 110 identified as a person is posed (e.g., limb/joint positions) via a third algorithm/model. The third algorithm/model may use the input from for the first object 110a and the second object 110b, but not the third object 110c due to the identification of the first object and the second object 110b. Additional algorithms/models may produce additional attributes, such as an association attribute 240, a mood attribute 250, a focus attribute 260, etc.

In some embodiments, an algorithm/model that produces attribute outputs at a rate slower than another algorithm/model may provide a last-produced output or a null output to match the faster rate of the first algorithm/model in the scene graph 200. For example, consider a first algorithm/model that produces an output in every time division (e.g., at times $t_0$, $t_1$, $t_2$, $t_3$, etc.) and a second algorithm/model that produces an output every other time division (e.g., at times $t_1$, $t_3$, $t_5$, $t_7$, etc.). A scene graph 200 that reports the outputs of the first and second algorithms/models at every time division (i.e., at a shared rate with the first algorithm/model) may present a value for the second algorithm/model at the non-outputting times (e.g., at times $t_0$, $t_2$, $t_4$, $t_6$, etc.) as one or more of a "null" value in a placeholder for the attribute, an omission of the attribute from the scene graph 200, or a last-known value for the attribute (e.g., the value for time $t_{x-1}$ at time $t_x$).

FIG. 2B illustrates a second scene graph 200b at time $t_2$ from the perspective of the second sensor 120b shown in FIGS. 1A-1C, according to various embodiments of the present disclosure. The second scene graph 200b may include the same set or a different set attributes than are included in the first scene graph 200a, and those attributes that are included are determined based on the perspective of the second sensor 120b. For example, the second scene graph 200b does not include a focus attribute 260 like the first scene graph 200a does. Additionally, because of the different perspectives of the first sensor 120a and the second sensor 120b, a different set of objects 110 may be identified in the second scene graph 200b from the first scene graph 200a, and the same object 110 may be given different identifiers by the different sensors 120.

In various embodiments, the second sensor 120b determines different values for the same attributes that the other sensors 120 determine, and may determine those values at different rates. For example, the second sensor 120b may include more accurate or faster algorithms/models for determining a pose attribute 230, and return results faster than a first sensor 120a, e.g., returning a result at time $t_2$ based on an image captured at time $t_2$ rather than based on an image captured at time $t_1$.

In some embodiments, the attributes included in the scene graphs 200 include the determined values for those attributes, but also include confidence scores in those values. In one example, a position attribute 220 may include values for coordinates along with a confidence score for a margin of error or measurement tolerance of the sensor 120 (e.g., X±Y meters distant from the sensor 120, A°±B° away from a centerline of the sensor 120). In another example, an association attribute 240, indicating whether a given object 110 is associated with another object 110, may include a confidence score for how likely the two objects 110 are associated with one another (e.g., A is associated with B, X % confident). In a further example, a mood attribute 250 may include several mood identifiers (e.g., happy, sad, confused) and a several confidences in whether a person is affecting those moods (e.g., 90% certain happy, 10% certain sad, 50% certain confused). Two local scene graphs 200 may indicate the same value for a given attribute, but different confidences in those values.

FIG. 2C illustrates a third scene graph 200c at time $t_2$ from the perspective of the collector 130 shown in FIGS. 1A-1C, according to various embodiments of the present disclosure. The third scene graph 200c is a global scene graph 200 that merges the data from the local scene graphs 200 at a given time and provides a coherent dataset to downstream applications that hides any delays in algorithms/models that process at different rates. The global scene graph 200 incorporates the data received from the local scene graphs 200, therefore the third scene graph 200c includes an identity attribute 210, a position attribute 220, a pose attribute 230, an association attribute 240, a mood attribute 250, and a focus attribute 260.

In various embodiments, the collector 130 may reformat the data from the local scene graphs 200 when creating the global scene graph 200. For example, the third scene graph 200c includes a positional attribute 220 that indicates the positions of the objects 110 in Cartesian coordinates, whereas the first scene graph 200a and the second scene graph 200b indicated polar coordinates.

In one example, each of the sensors 120 provide local scene graphs 200 to the collector 130 that include up-to-date position attributes 220. The collector 130 merges the position attributes 220 from the local scene graphs 200 (and locations of the sensors 120 in the environment 100 in some embodiments) to triangulate or otherwise determine the position of an object 110 in the environment 100 for the most recent time. Stated differently, when the local scene graphs 200 for time $t_x$ include local values for various objects 110a at $t_x$, the collector 130 can refine those local values into a global value for that object 110 at time $t_x$, which the collector 130 then provides to downstream applications.

In situations in which not all of the sensors 120 provide a local value for an attribute of an object 110 at time $t_x$ in a local scene graph 200 for time $t_x$, the collector 130 produces a global value for that object 110 at $t_x$ using the available values at $t_x$ and/or the most recent earlier-reported values for that attribute. For example, if at time $t_x$, neither the first scene graph 200a nor the second scene graph 200b include a value for an attribute determined based on time $t_x$, but the sensors 120 provided values at times $t_{x-1}$ and $t_{x-3}$, the collector 130 may produce a global value in the third scene graph 200c using the values reported in the local scene graphs at time $t_{x-1}$. In another example, when the first scene graph 200a but not the second scene graph 200b for time $t_x$ includes a value for an attribute determined based on time $t_x$, the collector 130 may produce a global value in the third scene graph 200c for time $t_x$ using the values reported in the first scene graph 200a and not the second scene graph 200b. In a further example, when the first scene graph 200a but not the second scene graph 200b for time $t_x$ includes a value for an attribute determined based on time $t_x$, the collector 130 may produce a global value for that attribute in the third scene graph 200c for time $t_x$ using the values reported in the first scene graph 200a for $t_x$ and the most recent value for that attribute reported in the second scene graph 200b. In cases in which the collector 130 uses data from prior times, the collector 130 may reduce a confidence score for the earlier determined values and/or report a result in the global scene graph 200 with a lower confidence than if the values were determined from the most recent local scene graphs 200.

Figure 3:
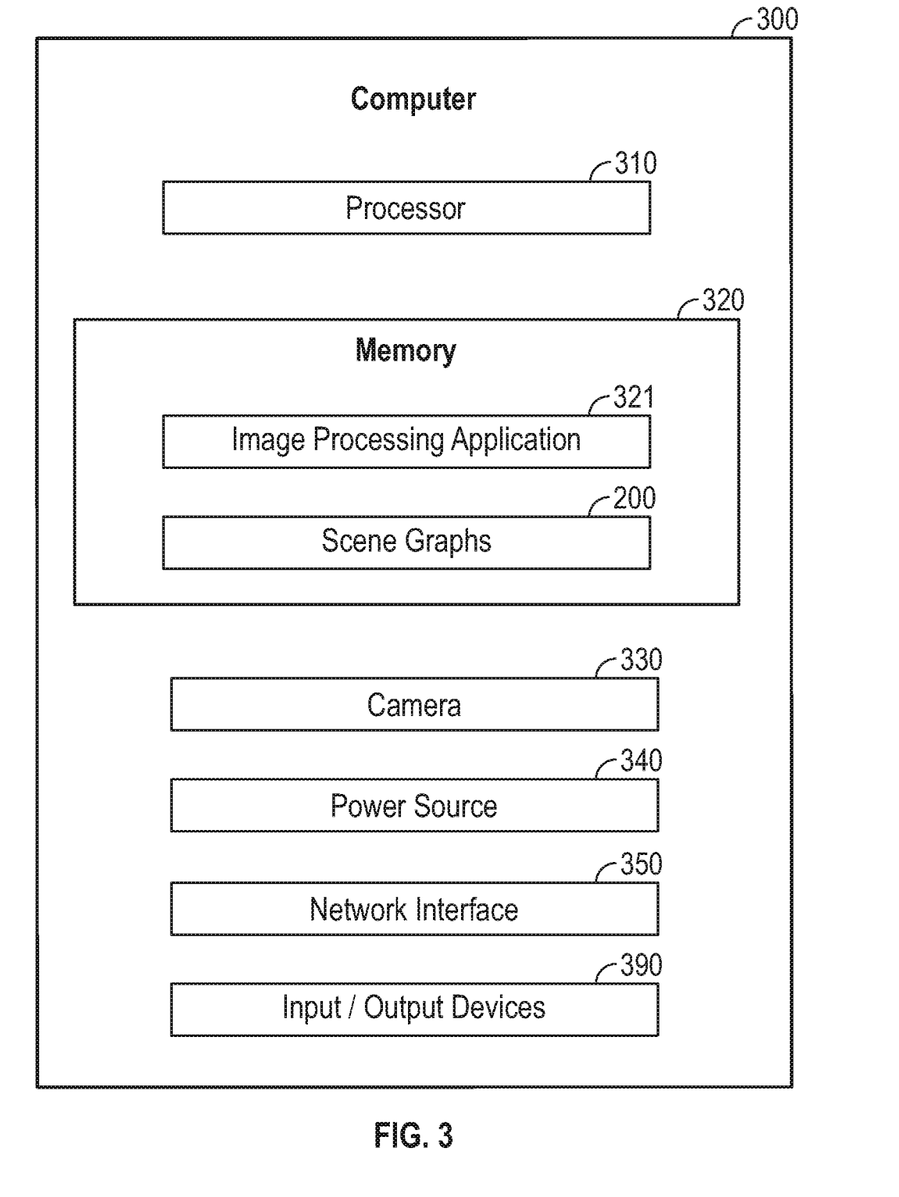
FIG. 3 illustrates a computing device, according to aspects of the present disclosure.

FIG. 3 illustrates a computing device 300. A computing device 300 includes a processor 310, a memory 320, and various hardware to produce and render a scene of the environment 100. In various embodiments, the computing device 300 may be implemented within a sensor 120, a collector 130, or a general computing device (e.g., a smart phone, a tablet computer, a laptop computer) that provides an image processing application 321.

The processor 310 and the memory 320 provide computing functionality to the computing device 300. The memory 320 may be one or more memory devices, such as, for example, Random Access Memory (RAM), Read Only Memory (ROM), flash memory, or any other type of volatile or non-volatile storage medium that includes instructions that the processor 310 may execute. The processor 310 may be any computer processor capable of performing the functions described herein, and may include a system clock or other timekeeping device used to determine when an image is captured or a scene graph 200 is generated or transmitted.

The memory 320 generally includes program code for performing various functions related to image processing. The program code is generally described as various functional "applications" or "modules" within the memory 320, although alternate implementations may have different functions and/or combinations of functions. The memory 320 also generally includes data structures that may store information for use by the various program code modules also stored thereon. The memory 320 includes program code for an image processing application 321 and data structures for scene graphs 200, although other applications and data structures may also be included by the memory 320.

The image processing application 321 is generally configured to provide functionality to observe objects 110 in an environment 100 and determine how those objects 110 interact with one another and the environment 100. In some embodiments, an image processing application 321 running on a sensor 120 identifies objects 110 in the environment 100 from the perspective of the sensor 120 and outputs various analyses (which may be performed asynchronously from one another or synchronously with one another) of the environment 100. In some embodiments, several sensors 120 (each asynchronously running various analyses of the environment 100) asynchronously provide an image processing application 321 on a collector 130 with corresponding local scene graphs 200, and the collector 130 produces a global scene graph 200 from the several inputs to render a view of the environment 100 (e.g., generate visualizations of one or more virtual objects for display or inclusion in a scene graph 200 based on a set point of view) or track the objects 110 in the environment 100.

Scene graphs 200 include coordinate or positional data for various objects 110 identified in the environment 100. Although described herein in relation to scene graphs 200, the present disclosure may operate with other data structures or records. The scene graphs 200 may include positional data for objects 110 indicated via relative coordinates from a sensor 120 or a common point of reference (e.g., X meters from the sensor 120, X meters from another object 110) and/or by absolute coordinates (e.g., at latitude X and longitude Y). In addition to coordinate/positional data, various objects 110 may be classified and identified in the scene graphs 200 according to various attributes that are determined based on analyses of the environment 100. The attributes include an identity/classification (e.g., Person A versus Person B, child versus adult, person versus animal, dog versus cat, animate versus inanimate, wall versus floor), a feature layout (e.g., joint/limb alignment/positions in a person, laptop lid percent open/closed, ladder extended/contracted), a focus (e.g., gaze direction in a person, facing in an inanimate object, direction of travel in a vehicle), and a state (e.g., emotional states, powered states, in motion/at rest) of the object 110. In a more general sense, scene graphs 200 may include any type of data that that a particular sensor 120 is configured to sense. For example, orientation (e.g., upright or tilted), motion (e.g., in motion or still), temperature (e.g., hot or cold), sound emissions (e.g., snarling or purring), texture (soft or stiff), physical/operational state (e.g., clean or dirty), color (e.g., red or green), smell (e.g., sweet or acrid) and the like. The choice of which parameters to sense and incorporate into scene graphs 200 is made to meet the needs of a particular application within the constraints of the processing resources in sensors 120 and collector 130.

One or more cameras 330 are included in the computing devices 300 used as sensors 120 to provide a video feed of sequential images to identify objects 110 in the environment 100 from. The camera 330 may be included in the computing device 300 by wired or wireless communications with one or more additional cameras 330 so that the image processing application 321 may use cameras 330 providing several perspectives. A camera 330 may include one or more image cameras (to produce a two or three dimensional view of the environment) in the visible spectrum as well as non-visible spectrum in particular applications. Distances to objections in the scene may be derived from stereo images, or may be estimated using artificial intelligence techniques, or distances can be determined as well as using one or more range finders (not shown) to identify distances to various objects 110 from the sensor 120.

The power source 340 provides electric power to the various components of the computing device 300. Various examples of power sources 340 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 340.

The network interface 350 provides wireline and/or wireless communications for the computing device 300. In various embodiments, the network interface 350 is a radio transmitter/receiver, which receives signals from external sources and transmits signals to external devices. The network interface 350 may be in communication with various antennas and may configure messages to be transmitted or received according to various standards, such as, Bluetooth, Wi-Fi, or a proprietary standard. Several computing devices 300 may be placed into communication with one another via respective network interfaces 350 to provide and collect several views of an environment 100.

Additional Input/Output (I/O) devices 390 may be included in various embodiments of a computing device 300. The additional I/O devices 390 may include various lights, displays, and speakers (e.g. LEDs, IR transmitter/receivers, speaker, buttons, microphones, light sensors, etc.) for providing output from the computing device 300. For example, a speaker is an I/O device 390 that provides audio output (e.g., of an audio component of a video feed). In another example, a microphone is an I/O device 390 that receives audio information to provide audio input to the comuring device 300. The additional I/O devices 390 may include physical joysticks, physical steering wheels/yokes, physical buttons, physical switches, microphones, and a touch interface that designates various regions for use as virtual joysticks, buttons, switches, etc. A user may manipulate the various additional I/O devices 390 to signal the computing device 300 to turn on or shut down, alter a mode of operation, switch to a different application, change system settings (e.g., volume, brightness), etc.

Figure 4:
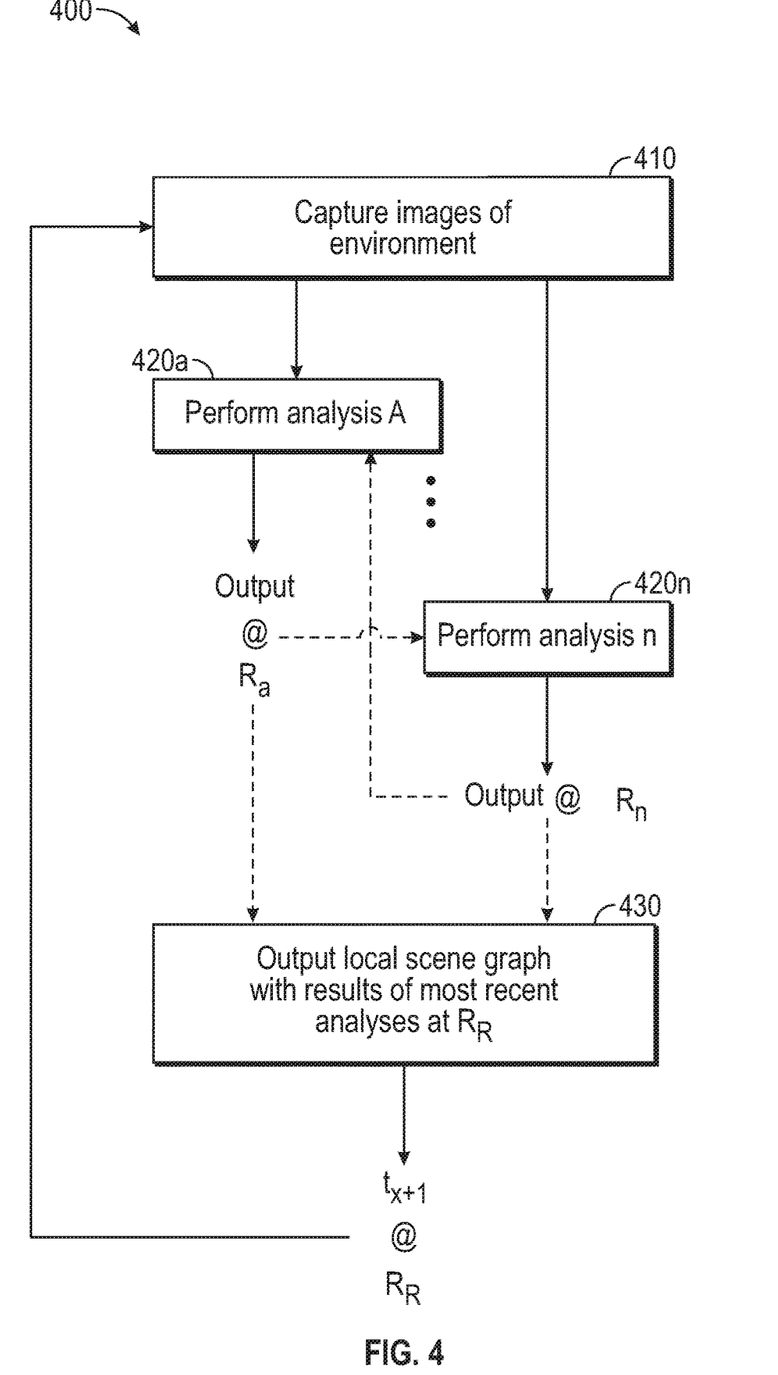
FIG. 4 is a flowchart of a method for a sensor to analyze an environment, according to aspects of the present disclosure.
Figure 5:
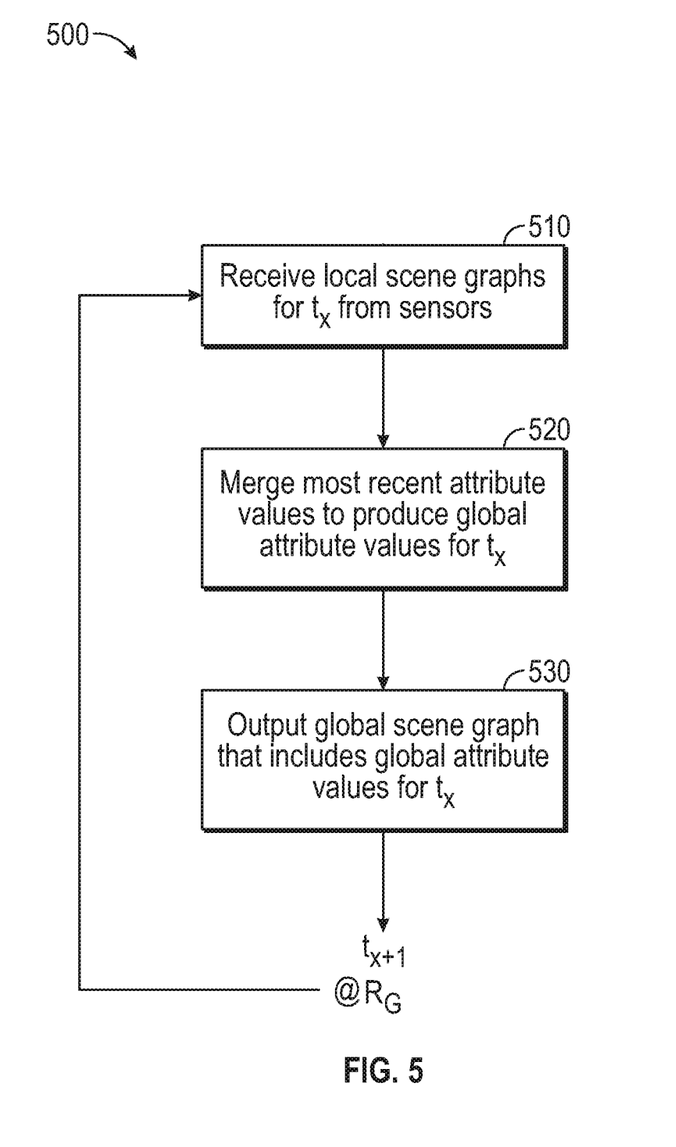
FIG. 5 is a flowchart of a method for perceptual data association using an arbitrary number of inputs collected from different positions and at different times, according to aspects of the present disclosure.
Figure 6:
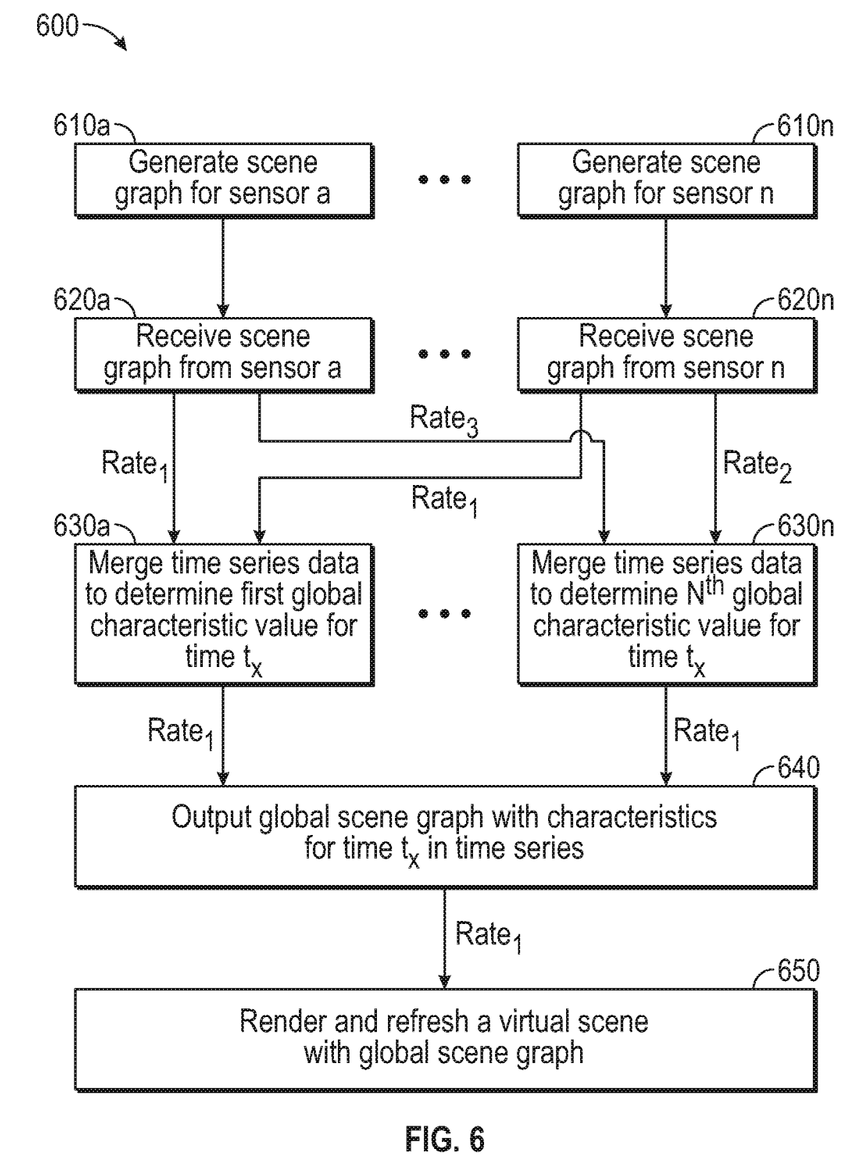
FIG. 6 is a flowchart of a method in which several sensors provide perceptual data to a collector that reconciles the data, according to aspects of the present disclosure.

FIG. 4 is a flowchart of a method 400 for a sensor 120 to analyze an environment 100. FIG. 5 is a flowchart of a method 500 for perceptual data association using an arbitrary number of inputs collected from different positions and at different times. Each of method 400 and method 500 may be run in parallel on different computing devices 300, and at different rates. FIG. 6 is a flowchart of a method 600 in which several sensors 120, each performing method 400 independently, provide perceptual data to a collector 130 performing method 500. Each of the example times given in FIGS. 4-6 and the related discussions are specific to an individual Figure and related discussion, although the rates discussed in FIGS. 4-6 may be understood across the Figures and related discussions.

Method 400 begins with block 410, where the sensor 120 captures one or more images of the environment 100 at time $t_x$. At blocks 420a-420n, the sensor 120 respectively performs analyses A through n. In some embodiments, the sensor 120 performs the analyses in parallel with one another, while in other embodiments an analysis may use the output of a different analysis as an input, and the analyses are performed in series. Analyses in blocks 420 may be algorithmic or implemented by artificial intelligence/machine learning techniques, or both. Accordingly, method 400 proceeds collectively from blocks 420a-n to block 430 in a given cycle for $t_x$, but individual blocks 420a-n may proceed to block 430 at a later time than other individual blocks 420a-n. Stated differently, the individual models a-n (implemented in software (e.g., as a machine learning classifier agent or an algorithm), hardware, firmware or hybrids thereof) used in blocks 420a-n may process at different rates, thus affecting what outputs are available as the most recent data for inclusion in the local scene graph 200 (generally referred to herein as a model or models a-n). For example, block 420a processes at a first rate $R_a$, while block 420n processes at an nth rate Rn.

At block 430, the sensor 120 outputs the most recently determined values for the objects 110 in the environment 100 in the local scene graph 200 for $t_x$. In some embodiments, the reporting rate $R_R$ at which the sensor 120 outputs the analyses of the environment 100 is specified by the collector 130. In some embodiments, the sensors 120 output the analyses at a rate $R_R$ tied to the output rate of a given model used to analyze the environment 100 (e.g., $R_a$, $R_n$), which may be the fastest-to-process model or another model specified by a user. For models that complete at a rate slower than the reporting rate, the sensor 120 may supply the last known values for the attributes analyzed by those slower models, predict values using a predictive technique such as linear quadratic estimation (LQE), or leave the fields associated with those attributes in a local scene graph 200 empty or null (or omit such fields until new data are available).

Method 400 returns to block 410 from block 430 to capture additional images or other forms of sensed information from the environment 100 for the next time $t_{x+1}$ (cycling through block 410 through 430 at rate $R_R$) and process those images to determine new attributes for the objects 110 therein. When the rate $R_R$ at which the sensor 120 reports the local scene graph 200 to the collector 130 is slower than or equal to the rate at which a given analysis is performed in blocks 420, the local scene graph 200 includes the results of that analysis in every scene graph 200. When the rate $R_R$ at which the sensor 120 reports the local scene graph 200 to the collector 130 is faster than the rate at which a given analysis is performed in blocks 420, the local scene graph 200 includes the results of that analysis intermittently (e.g., at a fraction of the reporting rate $R_R$) or includes the last-known value for that analysis at the reporting rate $R_R$.

Method 500 begins with block 510, where the collector 130 receives a local scene graph 200 from sensors 120 in the environment 100. The sensors 120 provide the corresponding local scene graphs 200 to the collector 130 asynchronously from one another, such that a first sensor 120a may provide a first local scene graph 200a every x milliseconds, a second sensor 120b may provide a second local scene graph 200b every y milliseconds, and an nth sensor 120n may provide an nth local scene graph 200n every z milliseconds. Each of the sensors 120 from which the collector 130 receives local scene graphs 200 may perform different individual analyses on the images captured by those sensors 120, and reports the most recent analyses at a predefined rate.

At block 520, the collector 130 merges the local scene graphs 200 received from the plurality of sensors 120 in the environment 100 for a given time $t_x$ to produce values for use in a global scene graph 200 for that time $t_x$. When attributes are determined by the sensors 120 at different rates (or the same rate, but at offset times), the collector 130 analyzes the received local scene graphs 200 to select the most recently reported values for the attributes from each local scene graph 200 to merge into the value for the global scene graph 200.

In various embodiments, to account for delays in the sensors 120 reporting the value of an attribute, the collector 130 uses the most-recently-reported value of the attribute from a particular sensor 120, but reduces the confidence score related to the accuracy of that value. For example, if a given sensor 120 reports a value of X for an attribute with a confidence score of Y % at time $t_0$, and the given sensor 120 does not report a value for that attribute at time $t_1$, the collector 130 may behave as though the given sensor 120 reported a value of X for the attribute at time $t_1$, but with a confidence score of Z % (where Y>Z).

In various embodiments, the collector 130 merges the values by averaging values for the data included in the local scene graphs 200 (which may be weighted by various confidence scores), choosing a value associated the highest confidence score among the local scene graphs 200, polling the local scene graphs 200 for a most frequent value (or most heavily weighted value) among the local scene graphs 200, etc. The collector 130 may use different merging techniques with different data types, such as, for example, selecting an identity type via a highest confidence score, confidence-weighted averages for coordinates, and polling for TRUE/FALSE attributes. Other merging techniques include data integration and data fusion.

In some embodiments, the collector 130 may merge the identities of two or more objects based on the characteristic values reported from multiple sensors 120. For example, several sensors 120 may independently identify a singular object 110 in the respective local scene graphs as different objects 110. The collector 130, when merging the several local scene graphs into a global scene graph, uses matching characteristic data from the several local scene graphs to correlate the identities of the different objects 110 as pertaining to one singular object 110, and merges the characteristic data from the several local scene graphs when describing that singular object 110 in the global scene graph. For example, the positional characteristics may be used to merge a first object 110a identified by a first sensor 120a at location X in the environment 100 with a second object 110b identified by a second sensor 120b at location X in the environment into a singular object 110 in the global scene graph. In various embodiments, the collector 130 may use attribute data beyond positional characteristics to determine if objects 110 identified by separate sensors 120 describe one object 110 or multiple objects 110. For example, several objects 110 may be identified at location X (e.g., a cluster of persons) by a first sensor 120a and a second sensor 120b, and attributes related to heights, facial expressions, clothing/hair color, direction of gaze, etc. may be used to differentiate the several objects 110 and group the characteristics from each sensor 120 with the appropriate object 110 from the cluster of objects 110. The collector 130 may iteratively process the datasets received from the sensors 120 to determine which objects 110 identified by the sensors 120 describe a singular object 110, and which identify separate objects 110.

In various embodiments, the collector 130 filters the data received from the sensors 120 when merging the local scene graphs 200. For example, the collector 130 may ignore any values reported from the sensors 120 that fall below a predefined confidence threshold as indicated from the sensors 120. In another example, the collector 130 may cluster the data points received from the sensors 120 and exclude outliers from consideration.

In some embodiments, the collector 130 filters the outputs created from the merged data from the local scene graphs 200. For example, a global scene graph 200 may omit a value for a merged attribute that is associated with a confidence score below a confidence threshold.

At block 530, the collector 130 outputs a global scene graph 200 for time $t_x$ that includes global values for the attributes that the sensors 120 individually reported. Method 500 returns to block 510 from block 530 to process local scene graphs 200 into a global scene graph 200 for a subsequent time $t_{x+1}$. The collector 130 cycles through blocks 510, 520, and 530 at the global rate $R_G$ to analyze a sequence of data organized in a time series and output a similarly organized time series of global scene graphs 200. The output global scene graph 200 is provided at a rate requested by downstream applications, which may include the designated rate at which the sensors 120 produce local scene graphs 200, a desired frame-rate at which a renderer refreshes a view of a virtual scene based on the environment 100, or another rate specified by a user. In this way, the collector 130 merges the data from the local scene graphs 200 according to the different rates at which the sensors 120 produce the data, while hiding any delays or variances in the rate of production from downstream applications or devices.

Method 600 begins with blocks 610a-n, where respective sensors 120a-n independently generate local scene graphs 200a-n of the environment 100 that include a plurality of characteristics determined for the objects 110 identified by the respective sensors 120a-n. The number of blocks 610a-n performed as part of method 600 corresponds to the number of sensors 120a-n located at various positions in the environment 100. As discussed in relation to method 400, an individual sensor 120 may determine and update a first characteristic at a first rate, a second characteristic at a second rate, an nth characteristic at an nth rate, etc., where the individual rates of determining/updating a particular characteristic may be the same as or different than other rates determining/updating other characteristics. Additionally, the characteristics that a particular sensor 120 determines and reports may be different than what other sensors 120 determine and report based on the objects 110 identified, the capabilities of the particular sensor 120, the location of the sensor 120 in the environment 100, and user preferences.

In some embodiments, the reporting rate $R_R$ is set according to the needs of a downstream application, while in other embodiments, the reporting rate $R_R$ is set according to the rate $R_{a-n}$ at which one or more of models providing analysis of the environment 100 are performed.

At blocks 620a-n, the collector 130 receives local scene graphs 200 from the various sensors 120a-n. The number of blocks 620a-n performed in a given iteration of method 600 is equal to or less than the number of sensors 120a-n, depending on the rate at which the individual sensors 120a-n provide the respective local scene graphs 200. Each of the sensors 120 may transmit a local scene graph 200 at various rates and the scene graphs 200 may be received at various times by the collector 130 (e.g., at the same rate, but with different time offsets). The collector 130 may batch the various scene graphs 200a-n for processing according to a first rate$_1$ at which the collector 130 produces a global scene graph 200 so that any local scene graphs 200 received within a time window are treated as being received for the same time $t_x$.

At blocks 630a-n, the collector 130 merges the attribute values received in the time series of local scene graphs 200. The number of blocks 630a-n performed in a given iteration of method 600 is equal to the number of characteristics that the collector 130 includes in the global scene graph 200. The collector 130 may use the value of a characteristic presented in one local scene graph 200 as the value for the characteristic in the global scene graph (e.g., confidence selection, polling, single-source) or amalgamate several values from several local scene graphs 200 (e.g., averaging, clustering) to use as the global attribute value. Regardless of the original rates at which the models produce the local characteristic values, and the rates at which sensors 120a-n provide the local scene graphs 200, the collector 130 merges the values for output at the first rate$_1$ used by the downstream application.

Using block 630a as an example, data for a first characteristic are received from a first local scene graph 200a at a first rate$_1$ and from an nth local scene graph 200n at the first rate$_1$. Having data available at the rate at which the collector 130 generates the global scene graph 200, the collector 130 merges the data for the first characteristic into the global characteristic value. In the present example, the collector 130 merges the value from the first local scene graph 200a at time $t_x$ and the value from the nth local scene graph 200n at time $t_x$ for the global value reported in the global scene graph 200 for time $t_x$.

Using block 630n as an example in which data for an nth characteristic are received from a first local scene graph 200a at a second rate$_2$ slower than the first rate$_1$ and from an nth local scene graph 200n at a third rate$_3$. In various embodiments, the third rate$_3$ is slower than, the same as, or faster than the second rate$_2$ (and may be slower than, the same as, or faster than the first rate$_1$). When handling data received from local scene graphs 200 at delayed times or slower rates than is output in the global scene graph 200, the collector 130 hides the delay or different rate of reporting by using the most recently available data from the various local scene graphs 200. For example, the collector 130 merges the value from the first local scene graph 200a at time $t_{x-2}$ and the value from the nth local scene graph 200n at time $t_{x-3}$ for the global value reported in the global scene graph 200 for time $t_x$. The various historic data from the time series of local scene graphs may be weighted (or the respective confidences adjusted) so that more recent data have a greater effect on the reported global value.

At block 640, the collector 130 outputs the global scene graph 200 according to the first rate$_1$ using the most recently determined values for the attributes used by the downstream applications. Because the collector 130 outputs the global scene graph 200 at the first rate$_1$, and merges that data at the first rate$_1$ regardless of the rate of update, any delays from the first rate$_1$ in calculating or reporting a particular attribute are hidden from downstream applications.

At block 650, the downstream application uses the global scene graph to render and/or refresh a virtual environment that mirrors the real-world environment 100 according to the attributes and characteristics for the objects 110 tracked by the sensors 120 in the environment. Method 600 may continue at the different rates on the sensors 120, collector 130, and any other computing devices 300 until ended by a user or a command.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, from a first sensor disposed at a first position in an environment, a first time series of local scene graphs comprising a first characteristic of an object in the environment that is updated at a first rate and a second characteristic of the object that is updated at a second rate different from the first rate;
   receiving, from a second sensor disposed at a second position in the environment, a second time series of local scene graphs each comprising the first characteristic of the object that is updated at the first rate and the second characteristic of the object that is updated at a third rate different from the first rate and the second rate;
   merging the first time series of local scene graphs with the second time series of local scene graphs according to the first rate to determine a global first characteristic for the object at the first rate;
   merging the first time series of local scene graphs with the second time series of local scene graphs according to the second rate and the third rate to determine a global second characteristic for the object at the first rate; and
   outputting a time series of global scene graphs including the global first characteristic and the global second characteristic at the first rate.

2. The method of claim 1, wherein the first characteristic is a spatial position of the object in the environment and the second characteristic is an attribute of the object, wherein the attribute is one of:
   an association with a second object in the environment;
   a feature layout of the object;
   a focus of the object; and
   a state of the object.

3. The method of claim 1, wherein merging the first time series of local scene graphs with the second time series of local scene graphs includes:
   identifying a singular object described with at least one matching characteristic in the first time series of local scene graphs and in the second time series of local scene graphs as separate objects;
   correlating a first identity of the singular object from the first time series of local scene graphs with a second identity of the singular object from the second time series of local scene graphs; and
   merging characteristics of the singular object included in the first time series of local scene graphs with corresponding characteristics of the singular object from the second time series of local scene graphs.

4. The method of claim 1, wherein merging the first time series of local scene graphs with the second time series of local scene graphs according to the second rate and the third rate further comprises:
   selecting a more recently determined one of the second characteristic in the first time series of local scene graphs and the second characteristic in the second time series of local scene graphs for use as the global second characteristic.

5. The method of claim 1, wherein merging the first time series of local scene graphs with the second time series of local scene graphs according to the second rate and the third rate further comprises:
   weighting the second characteristic in the first time series of local scene graphs according to a first ratio between the first rate and the second rate;
   weighting the second characteristic in the second time series of local scene graphs according to a second ratio between the first rate and the third rate; and
   for each time in the time series of global scene graphs, setting a value for the global second characteristic based on a respective weighted second characteristic in the first time series of local scene graphs and a respective weighted second characteristic in the second time series of local scene graphs.

6. The method of claim 1, wherein the second time series of local scene graphs includes a third characteristic of the object not included in the first time series of local scene graphs, further comprising:
   determining a global third characteristic for the object at the first rate based on the third characteristic in the second time series of local scene graphs,
   wherein the time series of global scene graphs includes the global third characteristic at the first rate.

7. The method of claim 1, further comprising:
   rendering, and refreshing at the first rate, a virtual scene based on the time series of global scene graphs.

8. A system, comprising:
   a processor; and
   a memory storage device, including instructions that when executed by the processor enable the processor to:
   receive, from a first sensor disposed at a first position in an environment, a first time series of local scene graphs comprising a first characteristic of an object in the environment that is updated at a first rate and a second characteristic of the object that is updated at a second rate different from the first rate;
   receive, from a second sensor disposed at a second position in the environment, a second time series of local scene graphs each comprising the first characteristic of the object that is updated at the first rate and the second characteristic of the object that is updated at a third rate different from the first rate and the second rate;
   merge the first time series of local scene graphs with the second time series of local scene graphs according to the first rate to determine a global first characteristic for the object at the first rate;
   merge the first time series of local scene graphs with the second time series of local scene graphs according to the second rate and the third rate to determine a global second characteristic for the object at the first rate; and
   output a time series of global scene graphs including the global first characteristic and the global second characteristic at the first rate.

9. The system of claim 8, wherein the first characteristic is a spatial position of the object in the environment and the second characteristic is an attribute of the object, wherein the attribute is one of:
- an association with a second object in the environment;
- a feature layout of the object;
- a focus of the object; and
- a state of the object.

10. The system of claim 9, wherein merging the first time series of local scene graphs with the second time series of local scene graphs includes:
- identifying a singular object described with at least one matching characteristic in the first time series of local scene graphs and in the second time series of local scene graphs as separate objects;
- correlating a first identity of the singular object from the first time series of local scene graphs with a second identity of the singular object from the second time series of local scene graphs; and
- merging characteristics of the singular object included in the first time series of local scene graphs with corresponding characteristics of the singular object from the second time series of local scene graphs.

11. The system of claim 8, wherein to merge the first time series of local scene graphs with the second time series of local scene graphs according to the second rate and the third rate the processor is further enabled to:
- select a more recently determined one of the second characteristic in the first time series of local scene graphs and the second characteristic in the second time series of local scene graphs for use as the global second characteristic.

12. The system of claim 8, wherein to merge the first time series of local scene graphs with the second time series of local scene graphs according to the second rate and the third rate the processor is further enabled to:
- weight the second characteristic in the first time series of local scene graphs according to a first ratio between the first rate and the second rate;
- weight the second characteristic in the second time series of local scene graphs according to a second ratio between the first rate and the third rate; and
- for each time in the time series of global scene graphs, set a value for the global second characteristic based on a respective weighted second characteristic in the first time series of local scene graphs and a respective weighted second characteristic in the second time series of local scene graphs.

13. The system of claim 8, wherein the second time series of local scene graphs includes a third characteristic of the object not included in the first time series of local scene graphs, wherein the processor is further enabled to:
- determine a global third characteristic for the object at the first rate based on the third characteristic in the second time series of local scene graphs,
- wherein the time series of global scene graphs includes the global third characteristic at the first rate.

14. The system of claim 8, wherein the processor is further enabled to:
- render, and refresh at the first rate, a virtual scene based on the time series of global scene graphs.

15. A non-transitory computer-readable medium containing computer program code that, when executed by operation of one or more computer processors, performs an operation comprising:
- receiving, from a first sensor disposed at a first position in an environment, a first time series of local scene graphs comprising a first characteristic of an object in the environment that is updated at a first rate and a second characteristic of the object that is updated at a second rate different from the first rate;
- receiving, from a second sensor disposed at a second position in the environment, a second time series of local scene graphs each comprising the first characteristic of the object that is updated at the first rate and the second characteristic of the object that is updated at a third rate different from the first rate and the second rate;
- merging the first time series of local scene graphs with the second time series of local scene graphs according to the first rate to determine a global first characteristic for the object at the first rate;
- merging the first time series of local scene graphs with the second time series of local scene graphs according to the second rate and the third rate to determine a global second characteristic for the object at the first rate; and
- outputting a time series of global scene graphs including the global first characteristic and the global second characteristic at the first rate.

16. The non-transitory computer-readable medium of claim 15, wherein merging the first time series of local scene graphs with the second time series of local scene graphs includes:
- identifying a singular object described with at least one matching characteristic in the first time series of local scene graphs and in the second time series of local scene graphs as separate objects;
- correlating a first identity of the singular object from the first time series of local scene graphs with a second identity of the singular object from the second time series of local scene graphs; and
- merging characteristics of the singular object included in the first time series of local scene graphs with corresponding characteristics of the singular object from the second time series of local scene graphs.

17. The non-transitory computer-readable medium of claim 15, wherein merging the first time series of local scene graphs with the second time series of local scene graphs according to the second rate and the third rate further comprises:
- selecting a more recently determined one of the second characteristic in the first time series of local scene graphs and the second characteristic in the second time series of local scene graphs for use as the global second characteristic.

18. The non-transitory computer-readable medium of claim 15, wherein merging the first time series of local scene graphs with the second time series of local scene graphs according to the second rate and the third rate further comprises:
- weighting the second characteristic in the first time series of local scene graphs according to a first ratio between the first rate and the second rate;
- weighting the second characteristic in the second time series of local scene graphs according to a second ratio between the first rate and the third rate; and
- for each time in the time series of global scene graphs, setting a value for the global second characteristic based on a respective weighted second characteristic in the first time series of local scene graphs and a respective weighted second characteristic in the second time series of local scene graphs.

19. The non-transitory computer-readable medium of claim 15, wherein the second time series of local scene graphs includes a third characteristic of the object not included in the first time series of local scene graphs, wherein the operation further comprises:

determining a global third characteristic for the object at the first rate based on the third characteristic in the second time series of local scene graphs, wherein the time series of global scene graphs includes the global third characteristic at the first rate.

20. The non-transitory computer-readable medium of claim 15, wherein the operation further comprises:

rendering, and refreshing at the first rate, a virtual scene based on the time series of global scene graphs.

\* \* \* \* \*